UNITED STATES PATENT OFFICE.

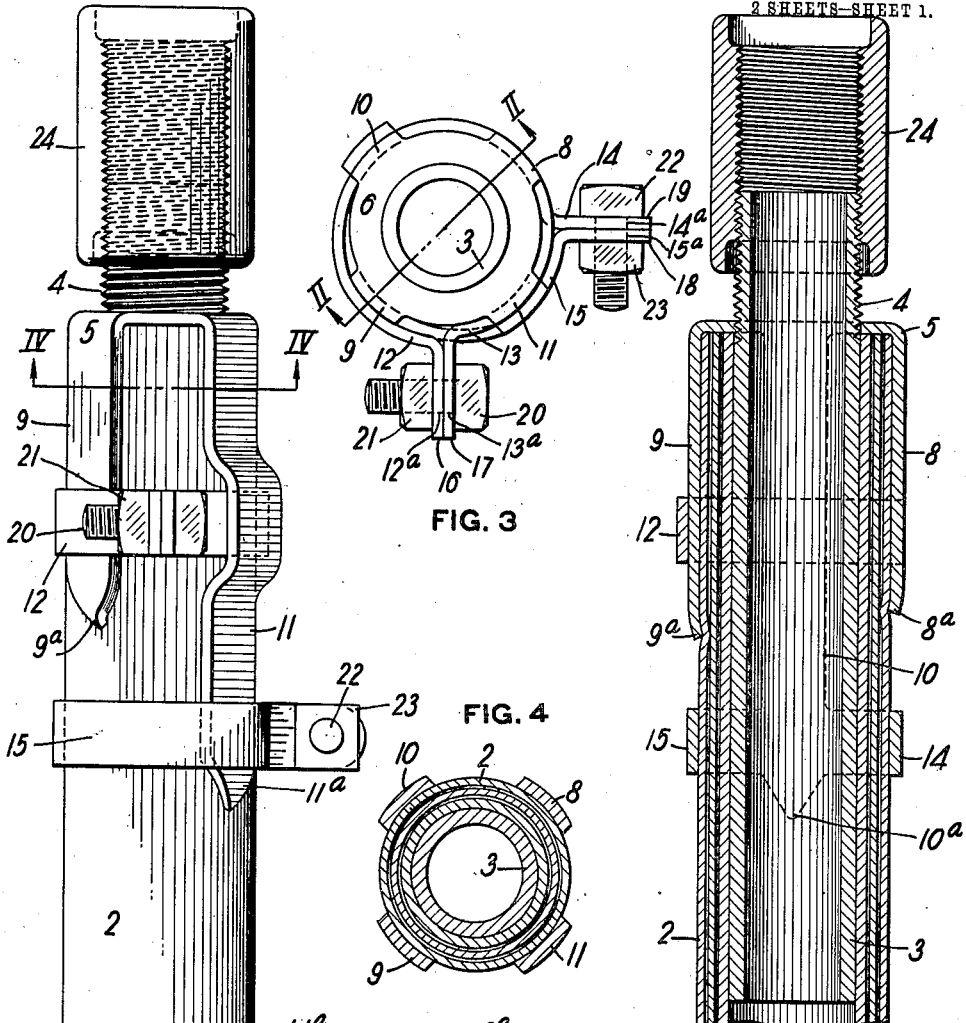

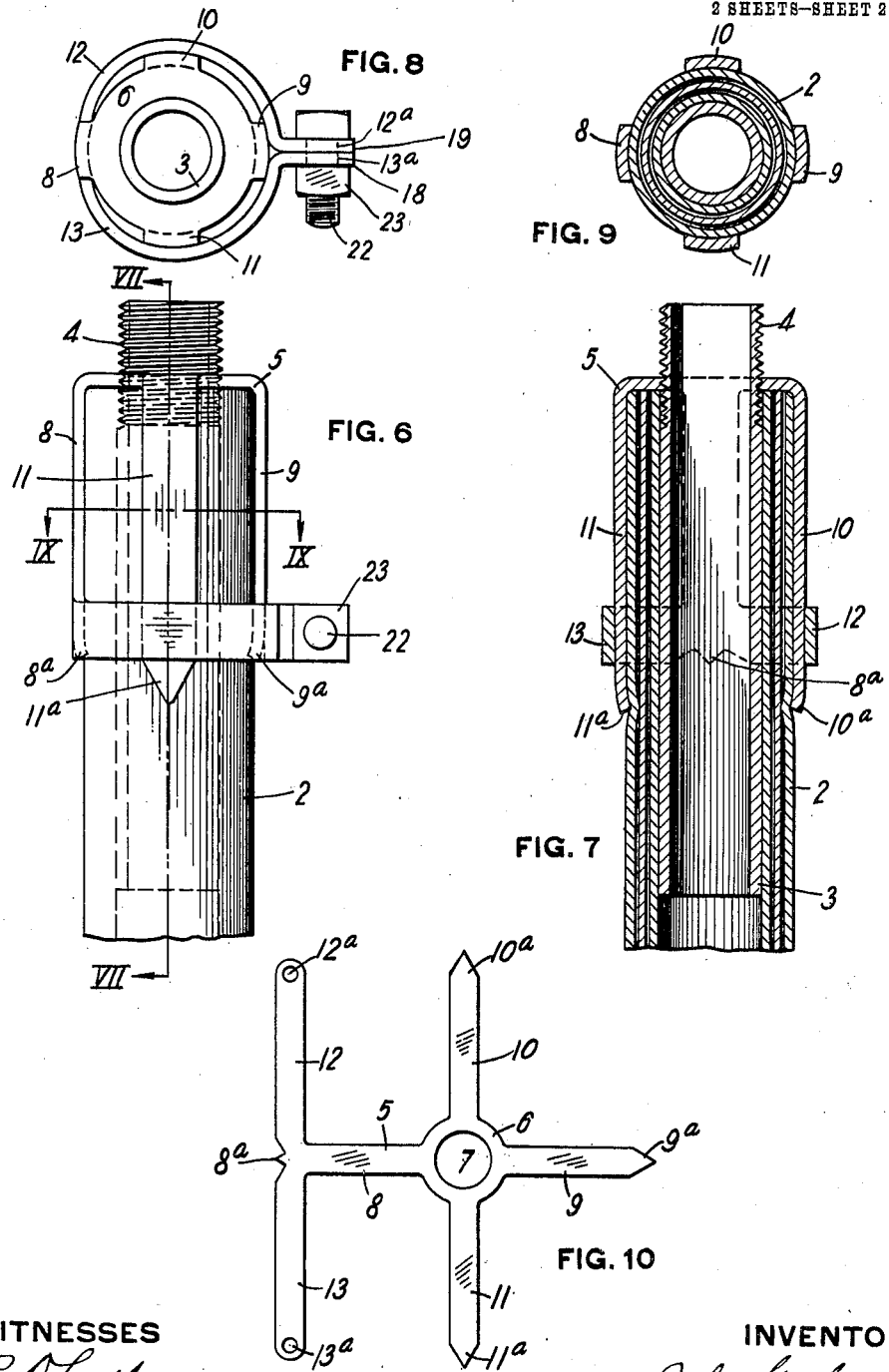

JOHN GETHING, OF YOUNGSTOWN, OHIO; WILLIAM GETHING, OF YOUNGSTOWN, OHIO, ADMINISTRATOR OF SAID JOHN GETHING, DECEASED.

HOSE-COUPLING.

1,101,844.  Specification of Letters Patent.  Patented June 30, 1914.

Application filed January 11, 1912. Serial No. 670,626.

*To all whom it may concern:*

Be it known that I, JOHN GETHING, a citizen of the United States, residing at Youngstown, in the county of Mahoning and State of Ohio, have invented certain new and useful Improvements in Hose-Couplings, of which the following is a specification.

My invention relates to hose couplings and the clamps forming part of such devices, used in securing the coupling members in place on the end of a section or length of hose formed of rubber, woven fabric or other suitable flexible material.

One object of my invention is to provide a hose coupling of improved construction having novel means whereby the hose coupling members are fastened and held in position on the ends of the hose sections.

Another object of my invention is to provide a hose coupling having improved means whereby the hose clamping members of the coupling are tightened and held in position on the hose in securing the end of the hose in place on the coupling, which, together with other objects of this invention will be more clearly understood as the invention is more fully described hereinafter.

Referring to the accompanying drawings forming part of this specification, Figure 1 is a longitudinal plan showing one section of a hose coupling, constructed and arranged in accordance with my invention, as attached for use to the end of a flexible hose. Fig. 2 is a longitudinal section of the same showing the coupling member as inserted within the end of the hose, the section being taken on the line II—II of Fig. 3. Fig. 3 is an end elevation of the construction illustrated in Figs. 1 and 2. Fig. 4 is a transverse section taken on the line IV—IV of Fig. 1. Fig. 5 is a plan showing a development of the clamp forming part of this invention and illustrated in Figs. 1, 2, 3 and 4. Fig. 6 is a longitudinal plan similar to that shown in Fig. 1 showing a modified form of clamping member as made in accordance with my invention. Fig. 7 is a longitudinal sectional plan of the apparatus shown in Fig. 6, the section being taken on the line VII—VII of Fig. 6. Fig. 8 is an end elevation of the construction illustrated in Figs. 6 and 7. Fig. 9 is a sectional end elevation of the same, the section being taken on the line IX—IX of Fig. 6. Fig. 10 is a development of the clamp employed in the construction shown in Figs. 6, 7, 8 and 9.

In the drawings, referring to Figs. 1 to 5, the numeral 2 designates one end of a section or length of a flexible hose to which my improved hose coupling and the clamp forming part thereof are applied for use. The hose may be formed of rubber, canvas, or other fabric, a rubber coated fabric, or other suitable material. A hollow tubular metal sleeve or nipple 3 having its outer end provided with screw threads 4 is inserted within the hose 2, this nipple preferably being formed of or from a short piece of metal pipe or tube, the portion thereof within the hose having a smooth outer surface practically free from projections. On the outside of the end of the hose 2 and tightly held in engagement with the outer surface thereof is a clamp 5 forming a novel part of this invention. As will be best seen in the development shown in Fig. 5 the clamp is formed of a thin flat rolled metal sheet or plate which is sheared and punched to the contour shown in Fig. 5 and is then bent into the shape shown in Figs. 1 to 4. By reference to Fig. 5 it will be seen that the circular portion 6 of the sheared and punched plate has an aperture or hole 7 therein of substantially the diameter of the nipple or sleeve 3, the outer threaded end 4 of this nipple extending through this opening when the parts are assembled in securing the hose 2 to the coupling of which the nipple 4 or its equivalent forms a part. Projecting outwardly on opposite sides of the axial center of the circular central portion 6 of the clamp are prongs 8 and 9 and extending outwardly on opposite sides of the axial center of the central portion 6 and at right angles to the prongs 8 and 9 are similar prongs 10 and 11. The prongs have pointed outer ends 8ª, 9ª, 10ª and 11ª, and the opposite extending prongs 8 and 9 are of about the same length. The oppositely extending prongs 10 and 11 are of about the same length, the prongs 8 and 9 being somewhat shorter than the prongs 10 and 11. Extending outwardly from opposite side edges of the prong 8 adjacent to its pointed outer end are the tongues 12 and 13 and extending outwardly in a similar manner from opposite side edges of the prong 10 are oppositely projecting tongues 14 and 15. The outer ends of the tongues 12 and 13, 14 and 15 have openings or holes 12ª, 13ª, 14ª, 15ª therein for a purpose described later.

After the clamp has been formed as shown in Fig. 5, the prongs 8, 9, 10 and 11 are bent at an intermediate point in their length, closely adjacent to the inner ends thereof so as to bring the bent outer ends of the prongs into planes substantially perpendicular to the plane of the central portion 6 or in other words cause the prongs to extend substantially parallel to the longitudinal center of the nipple 3. The distance from the center of the opening 7 to the corners formed by bending the prongs will vary to suit the diameter of the hose to which the clamp is applied. The pointed ends 8ª, 9ª, 10ª, 11ª of the prongs are bent inwardly slightly beyond the plane of the inner surface of the prong of which they form a part as will be seen by reference to Figs. 1 and 2. After the prongs have been bent in this manner the tongues or wings 12 and 13 are bent or curved into the cylindrical shape shown in Figs. 1, 2 and 3, the ends of these tongues being bent outwardly to form opposite lugs 16 and 17, in which the holes 12ª and 13ª are located, these holes then registering one with the other. A bolt 20 is then inserted in the registering openings 12ª and 13ª and a nut 21 screwed on the threaded end of the bolt 20. The tongues 14 and 15 on the prong 10 are then bent in a similar manner and a bolt 22 having a nut 23 is inserted in the registering holes 14ª and 15ª in the lugs 18 and 19 formed on the ends of the tongues 14 and 15 in the same manner as in the tongues 12 and 13. The sleeve or nipple 3 is inserted within the end of the hose 2 and the clamp 5 is placed in position around the nipple, the sleeve projecting through the opening 7 so as to bring the circular portion 6 of the clamp 5 adjacent to or in contact with the end of the hose 2. The nut 23 on the bolt 22 is then tightened so as to draw the prongs 8 and 9 tightly into engagement with and securely hold the hose in place on the sleeve or nipple 3. The nut 21 on the bolt 20 also is tightened so as to draw up the prongs 10 and 11 in a similar manner. When the prongs 8 and 9, 10 and 11 are tightened into place, the inwardly inclined pointed ends of these prongs will dig into the flexible material forming the hose 2 so as to add to the frictional force by which the hose is held in place on the sleeve or nipple 3 by the contacting surfaces of the prongs and in this way increase the holding power of the clamp to a large extent. A pipe coupling 24 or equivalent means is employed in detachably securing the screw threaded ends of the nipples together and in this way coupling the adjacent ends of two sections of hose.

In the construction shown in Figs. 6, 7, 8, 9 and 10 the nipple or sleeve 3 is formed in the same manner as the sleeve described hereinbefore and the clamping member 5 of the coupling is formed in a very similar manner. The clamping member 5 has a central circular portion 6 with oppositely projecting prongs 8 and 9 and oppositely projecting prongs 10 and 11 extending outwardly lengthwise at right angles to the prongs 8 and 9. The prongs in this construction are all of the same length approximately however, their outer ends 8ª, 9ª, 10ª, 11ª being pointed and bent or inclined inwardly in the manner before described. But one of the prongs 8 in this construction is provided with tongues 12 and 13 extending lengthwise from the opposite side edges thereof instead of two as in the construction of Figs. 1 to 5. The prongs 8, 9, 10, 11 are bent in the same manner as has been described and the tongues 12 and 13 are bent or curved into circular shape so as to encircle the prongs 9, 10 and 11 so that when the nut 23 on the bolt 22 is tightened in the registering holes 12ª, 13ª provided in the lugs 18, 19, on the outer ends of the tongues 12 and 13 the prongs will be caused to engage with and secure the hose 2 on the nipple 3. It should be noted that the clamps with the prongs and tongues are formed integrally from a sheet of metal so that there are no loose parts to become disarranged or lost.

The advantages of my invention will be appreciated by those skilled in the art. A simple and cheap coupling is provided having a clamping member which effectively holds the hose in position on the coupling.

Modifications in the construction and arrangement of the parts may be made without departing from my invention.

Means other than the pipe coupling shown may be used in detachably connecting the ends of the nipples. The number of prongs on the clamps and the number of tongues embracing the prongs may be varied and other changes may be made within the scope of the appended claims.

I claim:—

1. A hose clamp formed of a single blank and comprising a body having a nipple-receiving opening, a plurality of substantially radial arms extending outwardly from the body and adapted to be bent at substantially right angles thereto to lie alongside of a hose, said arms being spaced to lie in spaced relation when bent at an angle to the body and a strap integral with one of the arms extending at substantially right angles thereto and adapted to be bent around said arms and having a length to form a band encircling said arms to hold them against the hose.

2. A hose clamp formed of a single blank and comprising a body having a nipple-receiving opening, a plurality of substantially radial arms extending outwardly from the body and adapted to be bent at substantially right angles thereto to lie alongside of a hose, a strap on one of the arms extending at substantially right angles thereto and adapted to be bent around said arms and having a length to form a band encircling said arms to hold them against the hose, and a similar strap on another of said arms and located at a different distance from the body of the clamp and adapted to be bent into a band encircling said arms.

3. A hose clamp formed of a single blank and comprising a body having a nipple-receiving opening, a plurality of substantially radial arms extending outwardly from the body and adapted to be bent at substantially right angles thereto to lie alongside of a hose, said arms being spaced to lie in spaced relation when bent at an angle to the body and a strap integral with one of the arms extending at substantially right angles thereto and adapted to be bent around said arms and having a length to form a band encircling said arms to hold them against the hose, and a fastening device for the ends of the strap.

In testimony whereof, I have hereunto set my hand.

JOHN GETHING.

Witnesses
  JOHN JOHNSTON,
  WILLIAM GRIFFIN.